Jan. 6, 1970 M. HOFFER 3,487,552

PRINTER'S TABLE

Filed March 23, 1967 5 Sheets-Sheet 1

INVENTOR
MAX HOFFER

BY

Caesar, Rivise, Bernstein & Cohen

ATTORNEYS.

Jan. 6, 1970 M. HOFFER 3,487,552
PRINTER'S TABLE
Filed March 23, 1967
5 Sheets-Sheet 2
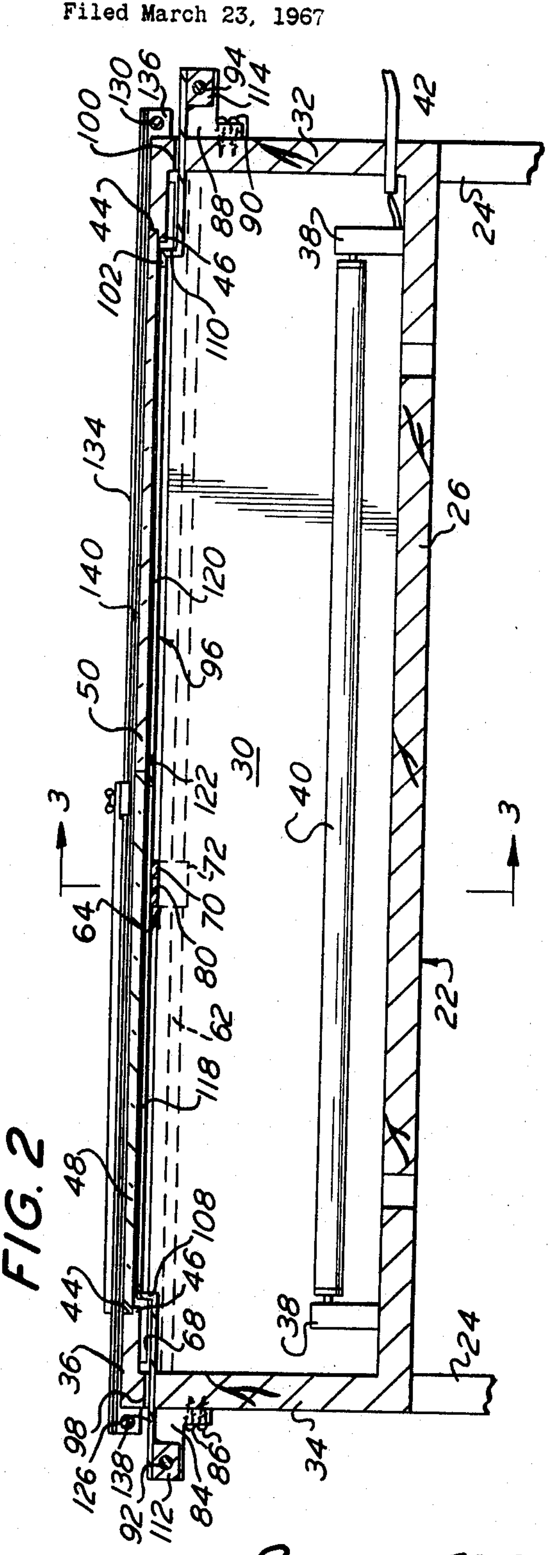
FIG. 2
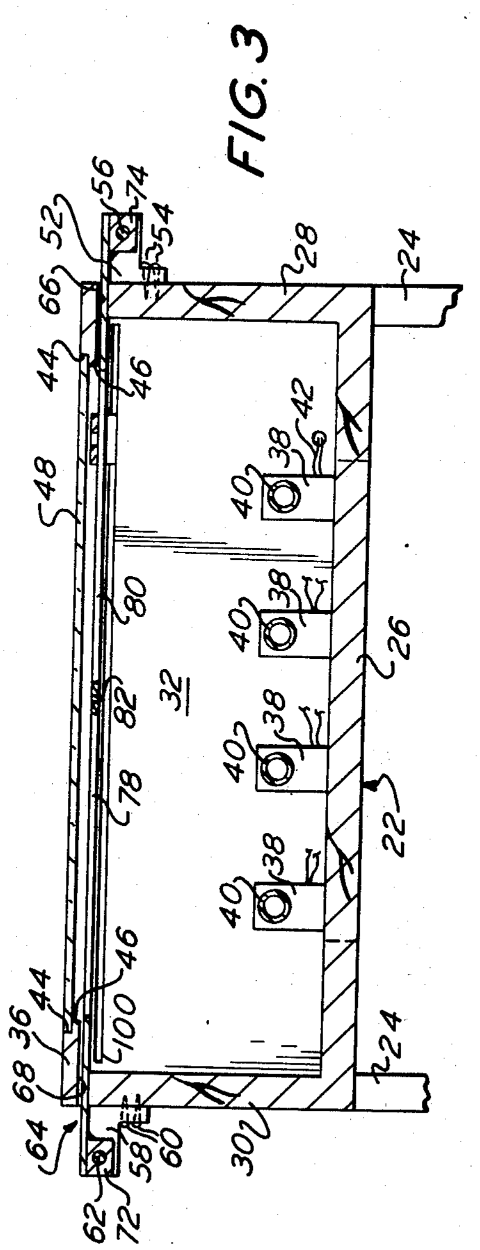
INVENTOR
MAX HOFFER
BY
Caesar, Rivise, Bernstein & Cohen
ATTORNEYS.

INVENTOR
MAX HOFFER
BY
Caesar, Rivise, Bernstein & Cohen
ATTORNEYS.

Jan. 6, 1970 M. HOFFER 3,487,552

PRINTER'S TABLE

Filed March 23, 1967 5 Sheets-Sheet 4

INVENTOR
MAX HOFFER

BY
Caesar, Rivise, Bernstein & Cohen
ATTORNEYS.

INVENTOR
MAX HOFFER
BY
Caesar, Rivise, Bernstein & Cohen
ATTORNEYS.

United States Patent Office
3,487,552
Patented Jan. 6, 1970

3,487,552
PRINTER'S TABLE
Max Hoffer, 1135 Tyson Ave., Philadelphia, Pa. 19111
Filed Mar. 23, 1967, Ser. No. 625,393
Int. Cl. G01b 1/22
U.S. Cl. 33—184.5 4 Claims

ABSTRACT OF THE DISCLOSURE

A printer's table is provided which facilitates the functions of pasting-up, stripping, editorial work, marking-up, ruling proofreading and line-up. The table includes a translucent platform with guidelines thereon to facilitate various ones of the printing operations. To further facilitate printing operations, illuminating means are provided beneath the translucent platform with guide members provided between the illuminating means and the platform. A ruling member is also provided above the platform.

This invention relates generally to printing and more particularly to providing a table for an editor and/or a printer which facilitates, inter alia, the functions of pasting up, stripping, editorial work, marking up, ruling proofreading and line up.

Producing a page of printed copy for either a newspaper or magazine is ordinarily a task that requires a skilled technician such as a printer. Even though computer controlled linotype machines are available for producing uniform columns of printed type, the present equipment available for organizing various articles on a single page or pages of a printed publication is not sufficient for an unskilled craftsman to organize these reproduction (commonly known as repros) to form a uniform page.

That is, after the printed material is produced by the linotype machine into columns of type, a reproduction is made from the type onto a column of paper. Each article for a paper is thus produced in such a column. In most smaller magazines, the page is normally comprised of three columns of linotype printed material. In the larger newspapers, typically eight columns of these linotype printed columns are used on each page.

In order to form the columns for each page, it is therefore necessary to splice together articles printed originally on a single column. It is thus understandable that in order to line up these columns of repros, fine measurements must be made in the units of measurements known as "picas" and "agates." Therefore, skilled printers are required who are able to measure and align these columns for organization of a magazine or newspaper page. This operation is commonly called "paste up" because the pluralities of repros are pasted to a carrier such as paper which is then photographed so that offset printing of an entire page at a time may be accomplished.

Advertisements which are comprised of pictuers and printed material also require accurate layout. Advertisements are made by pasting repros of pictures and printed material onto a carrier such as paper in organized fashion so that the advertisement meets aesthetic requirements and thus looks like a unitized layout. After the paste up of the advertisement is made, it is then photographed and offset printing of the advertisement is then completed. This function is known as editorial layout work and again requires a skilled printer who is able to measure and line up the pictorial as well as the graphic material.

After the photographs are taken of a pasted up page, the negative is then used with negatives of other pages to provide the single negative for an offset plate so that a plurality of pages may be printed simultaneously. It is therefore necessary to use a stripping or masking sheet which is as large as all of the pages which are produced simultaneously. Openings must then be made in the page for securement therein of the negatives of each page. For example, in some magazines, two pages are printed at a time on a sheet of paper. These pages are then folded over to make a magazine. The two pages are printed simultaneously onto each sheet of paper. It therefore requires a stripping page having two rectangular openings aligned with respect to each other for insertion of the negatives of each page. In order to make these openings, very accurate ruling is necessary and again it requires a skilled printer to produce such a stripping sheet to insure that the pages of the magazine are printed on the required part of the sheets which comprise the magazine.

Each of the above functions, in addition to such functions as marking up, ruling, proofreading, lining up and checking, require highly skilled craftsman which thereby increases the cost of producing printed pages of copy. Further, each of these functions is extremely time consuming in that guages must constantly be resorted to for purposes of alignment and composition.

It is, therefore, an object of the invention to overcome the aforementioned disadvantages.

Another object of the invention is to provide a new and improved printer's table which facilitates the function of pasting up.

Another object of the invention is to provide a new and improved printer's table to facilitate the function of stripping.

Another object of the invention is to provide a new and improved printer's table which facilitates the function of editorial layout.

Another object of the invention is to provide a new and improved printer's table to facilitate the function of marking up.

Another object of the invention is to provide a new and improved printer's table which facilitates ruling.

Another object of the invention is to provide a new and improved printer's table which facilitates proofreading and checking.

Another object of the invention is to provide a new and improved printer's table which facilitates lining up.

Another object of the invention is to provide a new and improved printer's table which facilitates pasting up, stripping, editorial laying out, marking up, ruling, proofreading and lining up.

These and other objects of the present invention are achieved by providing a printer's table having a platform including a translucent plate. The plate has guides for alignment of printed material on a flat carrier. Means are also provided for illuminating the bottom of the plate so that the guides are visible through the carrier.

In accordance with the invention, further guide means are also provided between the illuminating means and the translucent plates which are slidably mounted and provide supplementary guides for the printer. Additionally, a slidable rule is provided above the translucent plate which also includes an angularly extending rule for facilitating angular lining up and ruling.

Other objects and many of the attendant advantages of this invention will be readily appreciated as the same becomes better understood by reference to the following detailed description when considered in connection with the accompanying drawings wherein:

FIG. 2 is an enlarged sectional view taken along the line 2—2 in FIG. 1;

FIG. 3 is a sectional view taken along the line 3—3 in FIG. 2;

Referring now in greater detail to the various figures of the drawings wherein similar reference characters refer to similar parts, a printer's table embodying the invention is shown generally at 20 in FIG. 1.

Figure 1:
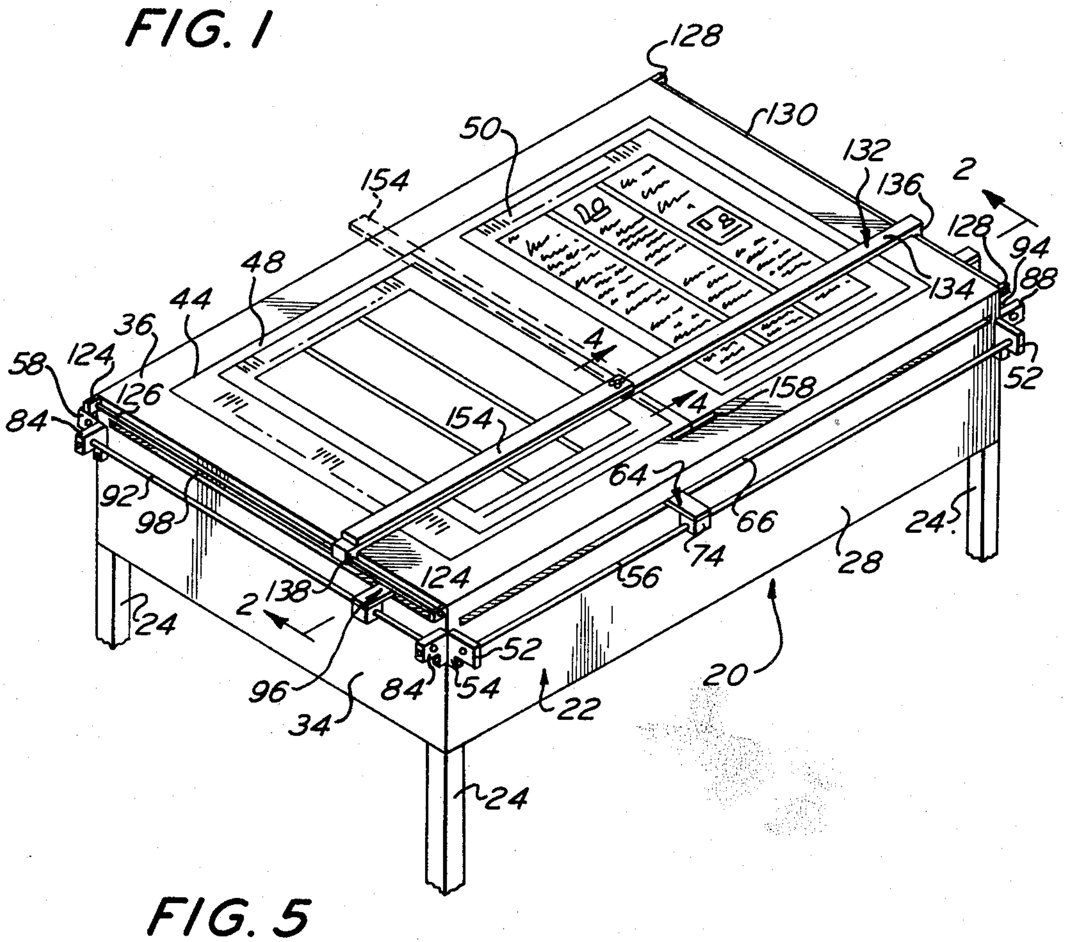
FIG. 1 is a fragmentary perspective view of a printer's table embodying the invention.
Figure 5:
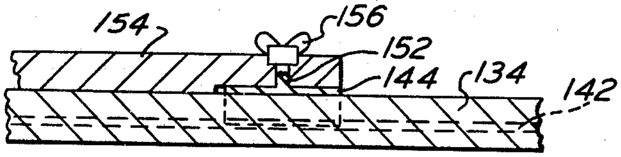
FIG. 5 is a fragmentary sectional view taken along the line 5—5 in FIG. 4.
Figure 4:
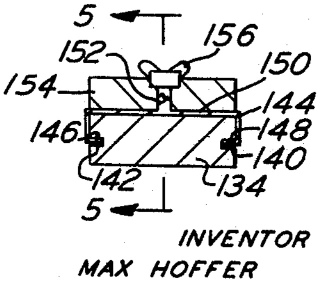
FIG. 4 is an enlarged sectional view taken along the line 4—4 in FIG. 1.

The printer's table 20 basically comprises a generally rectangular cabinet 22 which is supported by four vertically extending legs 24. As best seen in FIG. 2 and FIG. 3, cabinet 22 comprises a rectangular planar and horizontally extending bottom wall 26, vertically extending, rectangular, planar side walls 28 and 30, vertically extending, rectangular, planar end walls 32 and 34 and a horizontally extending, planar, rectangular top wall 36. Attached to the inside surface of bottom wall 26 are a plurality of fluorescent fixtures 38 which are adapted to receive and supply electrical power to a plurality of fluorescent bulbs 40. The fixtures and bulbs 38 and 40, respectively, are supplied electrical current via power cable 42 which is adapted to be plugged into conventional wall receptacle.

Top wall 36 includes a rectangular opening 44 the sides of which are substantially parallel to the edges of top wall 36. Top wall 36 also includes a ledge 46 which extends inwardly and peripherally about the opening 44. Ledge 46 acts to support a pair of translucent planar rectangular plates 48 and 50. Plates 48 and 50 preferably comprise frosted glass and include appropriate guidelines as will hereinafter be seen for facilitating various editing and printing functions.

As best seen in FIGS. 1 and 3, secured to the outside surface of wall 28 are a pair of mounting brackets 52 which are secured at the opposite lateral edges thereof and extend normally and outwardly therefrom. The mounting brackets 52 are secured by threaded fasteners 54 to the wall 28. Brackets 52 support a longitudinally extending rod 56 which is coextensive with the wall 28. A pair of similar brackets 58 are secured to wall 30 by a pair of threaded fasteners 60 at the opposite ends thereof and are vertically and horizontally aligned with brackets 52.

Figures 6, 7:
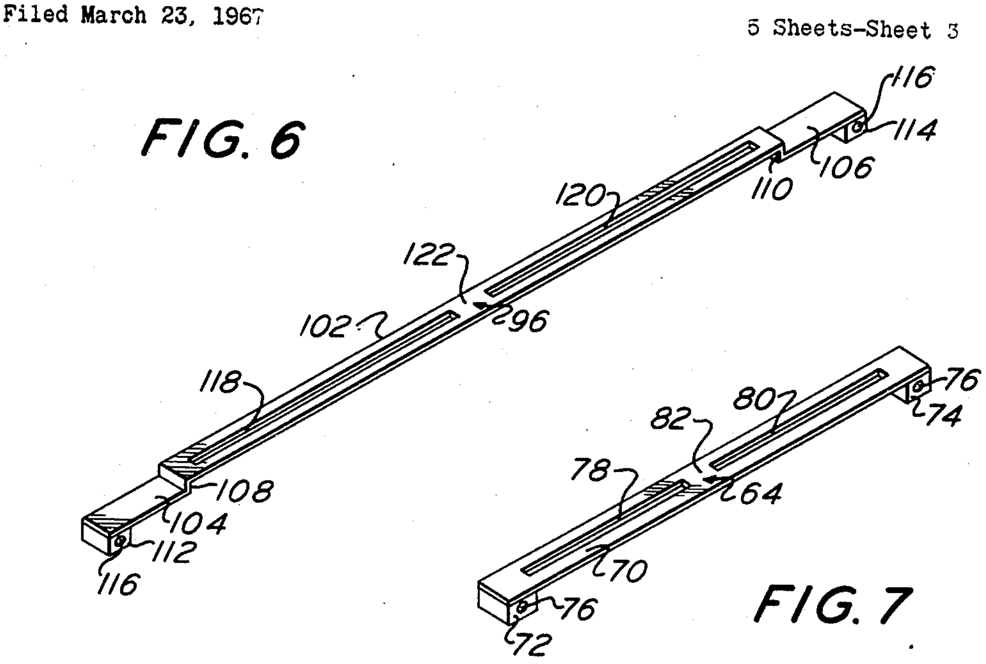
FIG. 6 is an enlarged perspective view of a longitudinally extending guide member.
FIG. 7 is a perspective view of a transversely extending guide member.

Brackets 58 support a longitudinally extending rod 62 which is coextensive with the wall 30. The rods 56 and 62 support a guide member 64 which is best seen in FIG. 7.

Guide member 64 extends from rod 56 to rod 62 through a pair of longitudinally extending slots 66 and 68 which are provided in walls 28 and 30, respectively. Slots 66 and 68 extend between but intermediate of the opposite ends of walls 28 and 30, respectively, and are substantially parallel to the rods 56 and 62.

Rod 64 basically comprises a rectangular elongated strip 70 and a pair of journals 72 and 74 which depend from said strip. The journals 72 and 74 each include a transversely extending bore 76 which is substantially of the same diameter as rods 56 and 62 and are adapted to slide longitudinally with the rods. The guide member 64 further includes a pair of longitudinally extending slits 78 and 80 in strip 70. Slits 78 and 80 extend inwardly from journals 72 and 74 and are separated by a medial strip 82.

The guide member is thus adapted to slide longitudinally along rods 56 and 62. The journals are so secured to the rods 56 and 62 that the guide member 64 is maintained substantially normal to the rods 56 and 62 as it slid therealong. Therefore, the guide member 64 also maintains a vertically extending relationship with respect to plates 48 and 50. The slits, as will hereinafter be seen in greater detail, enable a pair of fine slits of light to be passed therethrough which are visible through plates 48 and 50 and act as a supplementary guide line.

A pair of mounting brackets 84 are connected at opposite ends of end wall 34 by threaded fasteners 86. Similarly, a pair of mounting brackets 88 are connected to end wall 32 by fasteners 90 and are aligned with mounting brackets 84. Mounting brackets 84 support a transversely extending rod 92 which is parallel to and coextensive with wall 34. Brackets 88 support a transversely extending rod 94 which extends substantially parallel to and is coextensive with wall 32. Rods 92 and 94 are adapted to slidably support a guide member 96. Guide member 96 extends between rods 92 and 94 through a pair of slots 98 and 100 which are provided in walls 32 and 34, respectively, and extend longitudinally therealong.

As best seen in FIG. 6, guide member 96 comprises a longitudinally extending rectangular central strip 102, a pair of end strips 104 and 106 which are parallel to the central strip 102 and are connected thereto by normally extending integrally connected strips 108 and 110, and a pair of journals 112 and 114.

Journals 112 and 114 depend from the free ends of strips 104 and 106 at opposite ends of the guide member 96 and each includes a transversely extending bore 116. The bores 116 are each of a diameter substantially similar to the diameter of rods 92 and 94. The journals 112 and 114 are thus telescoped over rods 92 and 94 so that guide member 96 is longitudinally slidable along said rods.

Strips 108 and 110 act to vertically offset the central strip 102. Therefore, as best seen in FIG. 2, the guide member 96 slides above guide member 64. The central strip 102 also includes a pair of longitudinally extending slits 118 and 120 which extend from opposite ends of the strip inwardly and are separated by a central strip 122. As will hereinafter be seen, the slits 78, 80, 118 and 120 provide guidelines which supplement the guidelines provided on plates 48 and 50, respectively.

The journals of the guide member 96 enable the sliding of the guide member 96 along the length of rods 92 and 94 while maintaining the guide member 96 substantially normal to the rods. In this manner, the guide member always maintains a horizontal attitude with respect to the plates 48 and 50 for supplementing horizontal alignment.

Secured to wall 34 above and aligned with brackets 84 are a pair of brackets 124 which support a transversely extending rod 126 which is parallel to rod 92 and extends parallel to and horizontally coextensive with wall 34. A pair of brackets 128, similar to brackets 124 and aligned therewith, are secured to wall 32 and support a transversely extending rod 130 which is parallel to rod 94 and is horizontally coextensive with the wall 32. Rods 126 and 130 support a ruling member 132 which extens therebetween and is adapted to slide therealong.

The ruling member 132 is best seen in FIGS. 1, 2, 4 and 5 and basically comprises a longitudinally extending planarrectangular strip 134 and a pair of integral journals 136 and 138 which depend from the opposite ends of the strip 134 and each include a transversely extending bore which is substantially of the same diameter as rods 126 and 130. The journals 136 and 138 are thus telescoped over rods 126 and 130 so that ruling member 132 slides along the rods. The journals also act to maintain the ruling member 132 substantially normal to the rods 126 and 130.

The strip 134 includes a pair of grooves 140 and 142 of rectangular cross-section which extends longitudinally along the length of strip 134 along opposite lateral edges thereof. The grooves 140 and 142 extend inwardly and horizontally and are aligned vertically with respect to each other. A U-shaped bracket 144 is slidably secured to strip 134 and is slidably engaged in grooves 140 and 142. The slidable bracket 144 includes a pair of flanges 146 and 148 which are integral with the ends of the legs of the bracket and extend transversely and inwardly thereof.

The web 150 of bracket 144 includes an integral threaded member 152 which projects upwardly. A pivotable ruling leg 154 is pivotably secured to the threaded member 152 which extends through an opening at the end of the leg 154. A butterfly nut 156 is threadedly secured to threaded member 152 to tighten the leg 154 in a fixed angular position with respect to strip 134. The leg 154 is longitudinally elongated and is generally rectangular.

The leg 154 is pivotable to any angle on either side of the ruling member from 0° to 180° with respect to the strip 134 and securable thereat by tightening of nut 156. As shown in full line in FIG. 1, leg 154 is parallel to the strip 134. In this position, ruling member 132 is usable along its entire length for ruling without moving leg 154. However, leg 154 is also pivotable to a position normal to the strip 134 as shown in phantom in FIG. 1 or to any position intermediate thereto. Further, since bracket 144 is slidable along the ruling member 132, lines are rulable at any angle with respect to the ruling member 132 by use of the leg 154.

The plates 48 and 50 lie in the opening 44 upon ledge 46. As best seen in FIG. 1, a recess 158 is provided along the border of opening 44 centrally along a longitudinal edge. Recess 158 acts to enable removal of the plates 48 and 50 from the opening 44 by insertion of fingers therein to pry up the plates. These plates are thus removable for replacement or cleaning.

Figure 9:
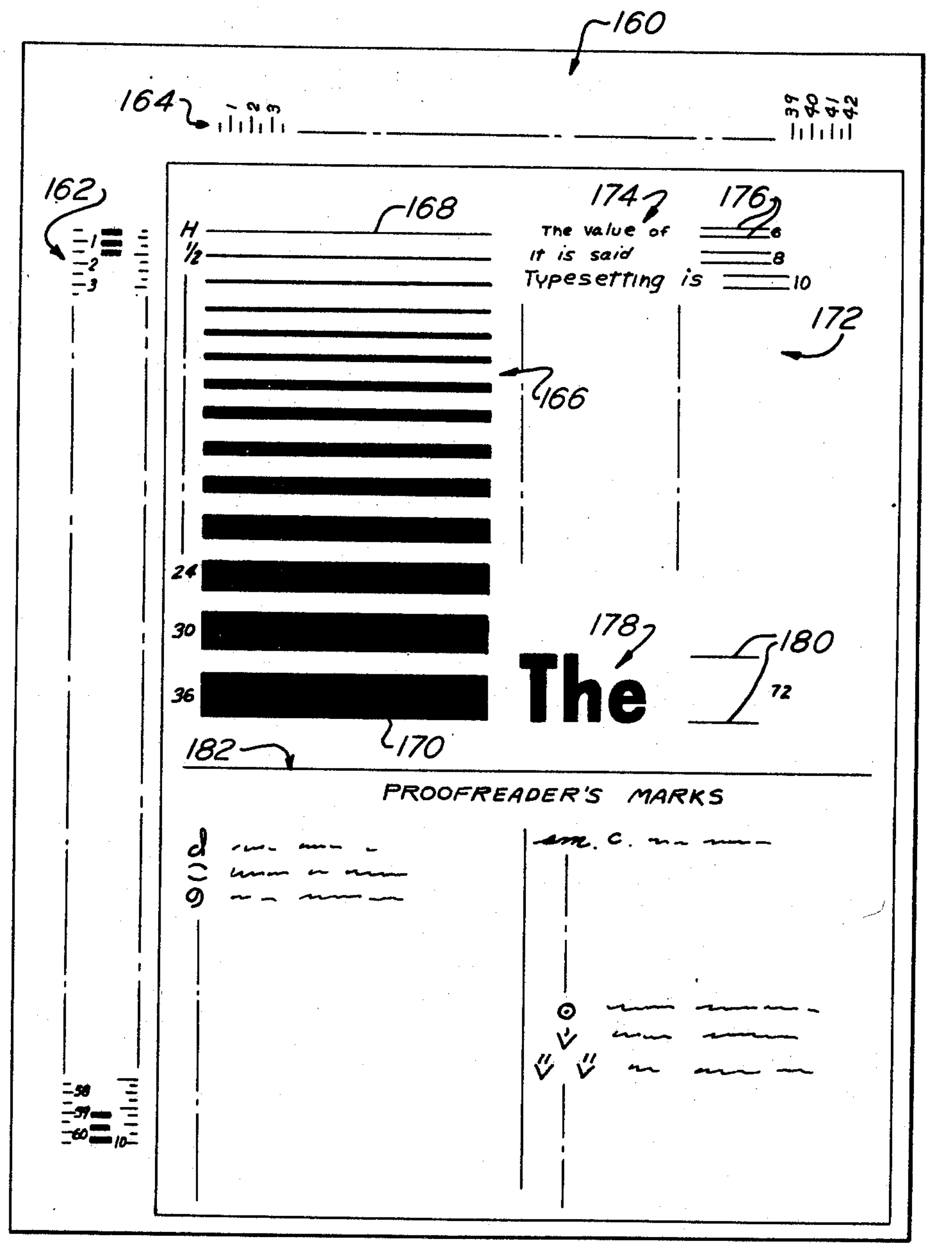
FIG. 9 is an enlarged plan view of a translucent plate used with the printer's table embodying the invention which facilitates editing.
Figure 10:
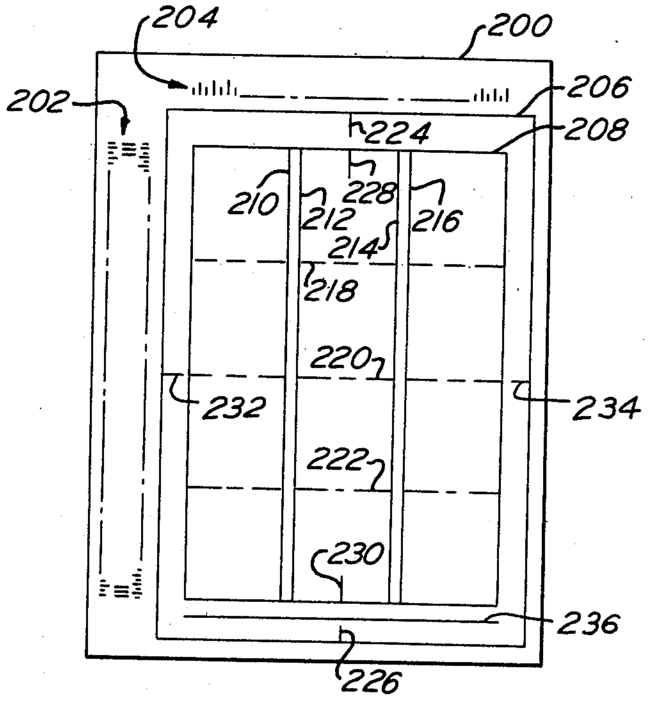
FIG. 10 is a top plan view of a translucent plate which is used with the table embodying the invention to facilitate paste-up, stripping, etc.
Figure 11:
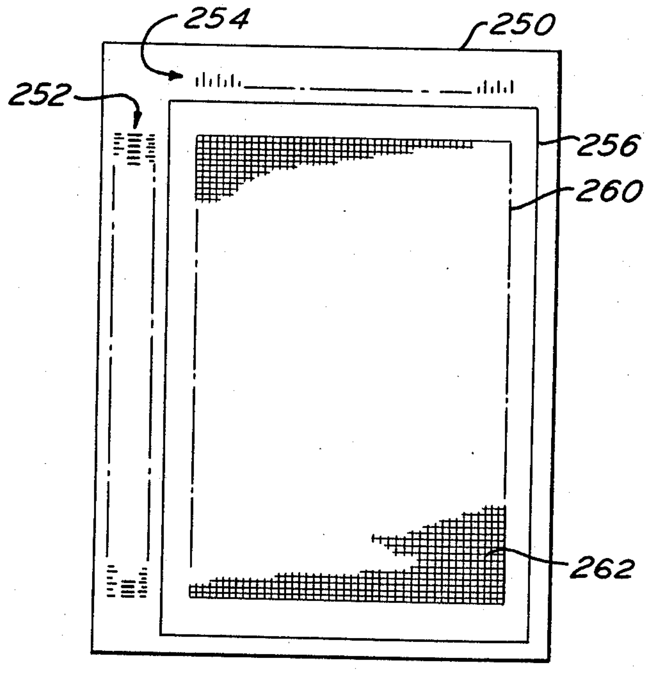
FIG. 11 is a top plan view of a translucent plate which is used with the table embodying the invention to facilitate ruling, laying out, etc.

It can therefore be seen that plates 48 and 50 are readily interchangeable. An example of the plates that may be used are shown in FIGS. 9, 10 and 11. Plate 160, shown in FIG. 9, is used either in the position of plate 48 or plate 50 shown in FIG. 1. The plate 160 which can be used as plate 48 or 50 is preferably comprised of a frosted glass having printed thereon various guidelines. Plates 160 is particularly adapted for editorial and proofreading tasks. The plate includes a longitudinally extending bank of scales 162. For example, in the preferred embodiment, the bank of scales includes scales for measurements in inches, agates and picas which are conventionally used by printers. Another scale 164 is provided which extends transversely along the top edge of plate 160. This scale is preferably in picas. The plate also includes a portion on which lines 166 of varying thicknesses are placed. The lines preferably range in size from uppermost line 168 which is of a hairline thickness to the lowermost line 170 which is preferably a 36 point line.

These lines 166 enable an editor to determine the size of the thickness of the line he desires to use for laying out a page. It should be noted that adjacent each of these lines, the designation of its thickness appears at its left. That is, at the left of line 168 the designation H appears.

Similarly, adjacent the 36 point line 130 appears the legend "36." The editor having seen the thickness of line which he desires to use can then look to the designation adjacent thereto and be able to specify the thickness of line that he desires to have used on a page.

The plate 160 also includes a section 172 which includes a plurality of lines of type which preferably range in size from 6 point to 72 point type. Thus, the uppermost line of type 174 is of 6 point type and on the right thereof adjacent thereto the legend "6" appears. It should also be noted that a pair of lines 176 which are aligned with the uppermost and the lowermost edges of the line of type 174 are provided about the legend "6." A similar pair of lines is provided with each of the lines of type. Thus, the lowermost line of type 178 has adjacent thereto a pair of lines 180 between which is the legend "72."

Portion 172 of plate 160 enables the editor to quickly evaluate what size type he desires by comparing the type used with the size provided adjacent thereto. Thus, if the line of type 174 appears aesthetically to be the right size to be used in an advertisement or other form of layout, the editor can immediately identify the line as 6 point type and can thus give instructions to the printer to have the sentence that he desires in the advertisement printed in 6 point type. The parallel lines 176 . . . 180 adjacent the lines of type 174 . . . 178 also enable the editor to determine quickly the size of type used in a printed message by placing the message between the parallel lines.

The remaining portion 182 of the plate 160 is a glossary of proofreader's marks. The glossary of proofreader's marks includes the marks that a printer uses in the margin of a sheet of corrected copy, the definition of the mark and the manner in which the mark is used on an incorrect line to edit the sheet. Thus, an inexperienced proofreader can quickly correct all of the mistakes in a sheet of printed copy and by referring to the glossary in portion 182 of plate 160, determine the proofreader marks that should be placed on the sheet so that the printer can quickly identify the mistakes on the sheet and correct them.

Plate 200, shown in FIG. 10, is similar to the plate 48 which is graphically illustrated in FIG. 1 in use with table 20. Plate 200 is preferably comprised of a rectangular frosted glass and is specifically adapted for facilitating paste-up and stripping. The guidelines provided on plate 200 basically comprise a bank of scales 202 which preferably include a scale in inches, agates and picas. A single scale 204 which extends transversely along the top of the page is provided which is preferably in a scale of picas. A page line 206 which is laid out rectangularly is provided which indicates the border of a page of a magazine or newspaper. That is, line 206 defines the periphery of a printed sheet. Another rectangularly laid out line 208 is provided within line 206 which defines the periphery of the printed portion of the page. The plate 200 is also provided with longitudinally extending lines 210, 212, 214 and 216. Line 210 defines the righthand edge of a first of three columns of print which would be used on a page. Lines 212 and 214 define the left and rightmost edge of a second column and line 216 defines the leftmost edge of the third column of print. It can therefore be seen that plate 200 is preferably utilized to provide a paste-up guide for a printed page having three columns of print. The plate further includes transversely extending dotted lines 218, 220 and 222 which extend across the lines 210 through 216 which define the borders of the three columns of print. Lines 218, 220 and 222 act to divide the columns into quarters and facilitate breaking up of articles and locating them within the columns. Lines 224 and 226 which extend inwardly and longitudinally from the central portions of the uppermost and lowermost borders of line 206 facilitates location of the center of the rectangle defined by line 206. A pair of longitudinally extending lines 228 and 230 which are aligned with lines 224 and 226 extend inwardly from the line 208 from the uppermost and lowermost borders of line 208. Lines 228 and 230 further facilitate location of the central line of the printed portion of a page.

A pair of horizontally extending lines 232 and 234 which are aligned with dotted line 220 extend inwardly from line 206 from the leftmost and rightmost borders thereof. These lines facilitate location of the horizontal center line of the rectangle defined by line 206. Lines 226 through 234 also facilitate dividing the printed part of a page into quarters for quarter page layouts.

A transversely extending line 236 is provided adjacent and parallel to the lowermost border of line 206 and is substantially coextensive with the lowermost border of line 208. The line 236 facilitates placement of the date and the page number on a printed page. It should be understood, that while plate 200 is used for magazines having three columns of type per page, the plate 200 may also be provided with a larger or smaller number of columns corresponding to the number of columns per page used in a publication.

Referring now to FIG. 11, a plate 250 is shown which facilitates such functions as ruling and editorial layout. Plate 250 is preferably comprised of a frosted rectangular planar glass and includes a bank of scales 252 which are preferably in inches, agates and picas which extend longitudinally along the lefthand border of the plate. A scale 254 which is preferably in picas is provided along the uppermost border of the plate 250 and extends transversely. A page line 256 which is laid out in the form of a rectangle defines the periphery of a page. Another rectangular border line 260 is provided which defines the periphery of the printed portion of a page. Within border line 260, a plurality of longitudinally and transversely extending lines 262 are laid out in graph form. Thus, in a preferred embodiment, the longitudinal lines are spaced from adjacent longitudinal lines preferably by a pica. Simularly, the transversely extending lines are each spaced by a pica longitudinally from each other. In this manner, one pica squares are formed. As will hereinafter be seen, this plate facilitates ruling and laying out of irregular shapes.

Figure 8:
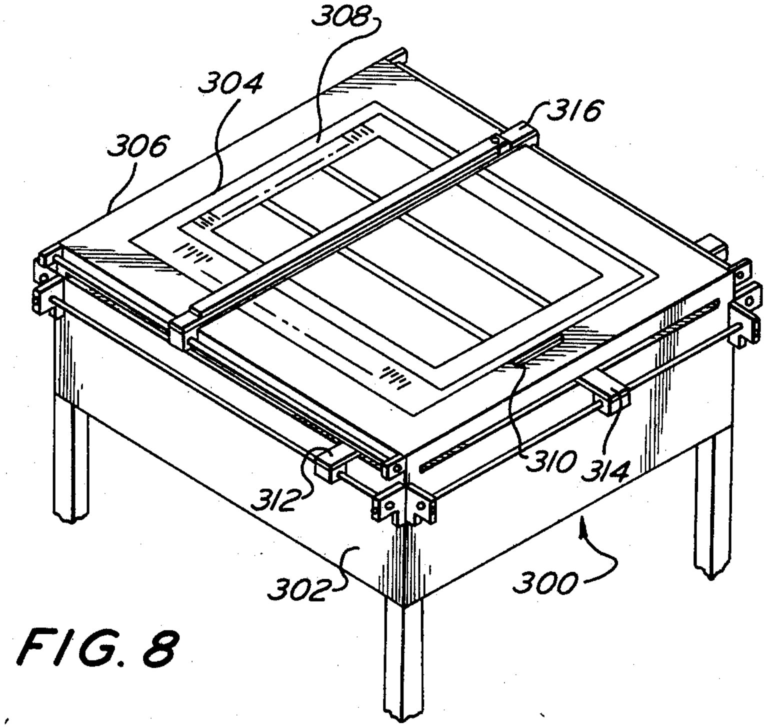
FIG. 8 is an alternate embodiment of a printer's table embodying the invention.

An alternate embodiment of the printer's table 20 is shown in FIG. 8. The printer's table 300 shown therein is similar in most respects to printer's table 20, but can be used only for the purpose of a single sheet at a time. The cabinet 302 of table 300 is otherwise similar to cabinet 28 of table 20 with the exception that opening 304 is provided in top wall 306 thereof is large enough to accommodate only a single plate 308. Plates 308 are similar to plates 48 and 50, 160, 200 and 250, shown in FIGS. 1, 9, 10 and 11, respectively. The opening 304 includes a recess portion 310 which enables removal of plate 308.

Guide members 312 and 314 are provided which are functionally similar to the guide members 64 and 96 shown in the embodiment of FIG. 1. Also, a ruling member 316 is provided which is similar to the ruling member 132. The printer's table 300 is similar in all remaining details to the table 20 showns in FIGS. 1 to 7.

It can therefore be seen that the invention is not limited to the use of a pair of translucent plates in the cabinet of the printer's table. Where it is desired to print more than one or two pages simultaneously on a sheet, a printer's table embodying the invention may include a cabinet having an opening large enough to facilitate as many plates as there are pages to be printed simultaneously.

Therefore, if in a printing operation, four pages are printed simultaneously onto a sheet and it is then cut up for insertion into a magazine or newspaper, a printer's table embodying the invention is used having an opening large enough to accommodate four translucent plates which are aligned in two columns of two. Similarly, if eight sheets are printed simultaneously, a printer's table having an opening large enough to accommodate eight plates, one for each page, are provided so that the plates can be placed in two rows of four each.

The operation and the uses of the printer's table 20 and 300 are best seen in conjunction with the following examples (unless otherwise specified, the operations are described in conjunction with table 20):

PASTE-UP

The operation of pasting up comprises using a carrier such as paper in the size sheet that is finally printed and pasting thereto the columns of print that appear on the page as finally printed. Paste-up therefore requires the accurate placement on the carrier of the columns of print so that the page is neatly and uniformly laid out. The printer's table 20 facilitates this otherwise tedious operation by utilization of plate 200 shown in FIG. 10 as plates 48 and 50 in FIG. 1. The flat carrier, which is the size of the pages to be printed, is aligned and placed within the line 206 on the plate 200. The fluorescent lamps 40 are lit and thereby back light the bottom of the plate 200. The carrier, being made of paper which is somewhat translucent, enables the user of the printing table to see the lines 202 through 236 on plate 200 through the carrier.

Since the guidelines on the plate 200 are visible, the columns of print are easily placed onto the carrier and pasted thereon within the guidelines. If a column on the finally printed sheet is to include a photograph or another insertion between the columns, the guide members 64 and 96 facilitate the spacing of the columns of type so that the photograph or insertion can be placed accurately thereon. That is, since guide members 64 and 96 include slits 78, 80 and 118, 124, respectively, these guide underneath the carrier are seen as illuminated straight lines.

Thus, guide member 96 underneath the plate 200 through the carrier appears as a pair of illuminated horizontally extending lines. The illuminated lines are seen not only underneath the section enclosed by line 208, but also underneath the bank of scales 202 of plates 48 and 50. A quick measurement of the height of any portion of the page can therefore be made by placing the guide member 96 underneath the point which is to be measured and then observing the point on the bank of scales that the illuminated line passes through.

Where, for example, it is desired that an insert such as a photograph be placed in the leftmost column of a page, the guide 96 is placed underneath the lowest portion of the printed column that has been pasted in the leftmost column. The user thereof can then quickly determine the height of the lowermost edge of the printed column by glancing at the bank of scales 252 at the position through which the illuminated line passes. The user then knowing how long the insert is can quickly add this length to the scale measurement, place the guide member 96 at the position on the scale corresponding thereto and use the illuminated line underneath the leftmost column as a guide to start placing further printed matter in the column.

Similarly, the guide member 64 when slid underneath the plate 200 is also seen through the carrier as a pair of vertically extending illuminated lines which are used to align matter to be pasted onto the carrier.

STRIPPING

The operation of stripping is, in effect, the making up of a larger negative for the printing of a plurality of pages in one operation. Thus, a large sheet known as stripping or masking paper is cut up so that openings are provided on the sheet for the placement of negatives which are made by photographing each of the pages which are to be printed together. Thus, for example, where two pages are to be printed together, a sheet of stripping paper which is substantially the size of plates 48 and 50 together is placed over the plates 48 and 50 and aligned with the edges thereof. Again, the plates 200 in FIG. 10 are used as plates 48 and 50 in FIG. 1. Where a complete negative has been made for each of the two pages to be printed together, the stripping process comprises placing the stripping paper over plates 48 and 50, lighting lamps 40 so that the guidelines of plate 200 can be seen through the stripping paper, moving the ruling member 132 in alignment with lines 208 so that the printer can rule outlines on the stripping sheet in accordance with the guideline of the plates. Thus, a pair of rectangularly laid out lines are ruled on the stripping paper over the lines 208 of the two plates 200 which are visible through the stripping paper sheet. The stripping sheet is then cut out in accordance with the lines ruled on the sheet and the negatives are then placed in the openings of the stripping sheet for the purposes of making an offset printing plate which is used to print two pages at a time.

EDITORIAL LAYOUT

Editorial layout comprises the laying out in other than column form such items as pictures and printed copy. This function is facilitated by utilizing the plate 250 as either plate 48 or 50 in the printer's table 20. As in the operation of paste-up, a flat somewhat translucent carrier such as paper is aligned with and placed within the rectangularly laid out line 256 which acts as a guideline for the placement of the sheet. The fluorescent lamps enable the lines 256 and 260 and the graph lines 262 to show through the carrier sheet. Repros such as photographs and printed copy are then placed accurately on the portion of the page. Accurate alignment is enabled by the graph lines which show clearly through the carrier sheet. Further alignment is facilitated by the use of the guide members 64 and 96 which further enable alignment between lines.

MARK-UP

Mark-up is the operation whereby the printer gives instructions to the editor as to the size of type that should be used in advertisement, at the lead of an article, etc. This function is facilitated by the use of plate 160 as plate 48 to 50 in FIG 1. The printer is given a printed sentence and then compares the type with the type used in portion 172 of plate 160. After seeing the size which is necessary, the printer can then clearly determine the size of type by glancing at the designation which appears to the right of the proper size type and then give the instruction to the editor concerning the size of type that should be used. Similarly, the size of lines to be used on the page for margins or borders can be quickly determined by reference to the lines 166 which are of varying thicknesses.

RULING

Ruling is normally used prior to editor layout work where the page that is used is divided into several portions. Thus, the carrier sheet is marked up by ruling lines, for example, to break the page into quarters, eighths and combinations thereof. In this operation, the plate 250 is preferably used as plate 48 or 50 in FIG. 1. The carrier sheet is then laid out thereover and is aligned and placed within line 256. The page is then divided into the various sections by using the ruling member 132 and aligning it with the various guidelines which comprise the graph portion of plate 250. Further, irregular sections or sizes are facilitated by using guide members 64 and 96 underneath the plate 250 and aligning the ruling member 132 therewith.

PROOFREADING

The proofreading operation comprises checking the paste-up to determine the accuracy of the locations of the placement of the repros on the carrier. This operation is facilitated by placement of the carrier over plates 48 or 50 and utilization of the guide members 64 and 96 thereunder to determine the alignment and the spacing of the repros. The guidelines on plates 48 or 50 which are preferably of the type shown on plate 200 further facilitates this proofreading function.

LINE-UP

Line-up is the function which enables printing by the offset process of plural colored pictures. That is, when printing a multi-colored picture by using the offset process, it is necessary to first print all of the black material with a first offset plate. Any other colors that are printed on to the final copy are printed with offset plates for the remaining colors. It is therefore important that the offset plates be aligned accurately so that the various colored portions of the picture are printed in their proper position otherwise the picture includes overlapping portions which makes the picture blurred. This function is facilitated by placing a carrier over plate 48 which is used for the first color to be printed. Then, the carrier from which the negative for the second color is made is aligned with the first carrier so that the repros placed on the carrier are aligned with each other. Similarly, if more than a two color picture is to be made, each additional repro is aligned with either the first and/or the second carrier by placement of the carrier thereover. The illumination provided below the carriers for each plate enables a quick visual alignment of the pages. The alignment is insured in that the printer can quickly see whether the carriers from which the offset plates are made line up with each other.

It can therefore be seen that a new and improved printer's table has been provided. The table provides illumination beneath translucent plates so that guides may be provided for the printer in various printing operations. Guidelines are provided on the translucent plate to provide accurate means for alignment of and placement of material within a printed page. The guide members provide further alignment means for facilitation of measurements and placement of material for a printed page. The ruling members enable the marking up of carrier sheets and stripping sheets to enable both paste-up, editorial layout and stripping, respectively.

Without any further elaboration, the foregoing will so fully illustrate my invention that others may, by applying current or future knowledge, readily adapt the same for use under various conditions of service.

What is claimed as the invention is:

1. A printer's table including a translucent platform, said platform having guidelines printed thereon, means for illuminating the bottom of said platform, elongated guide members slidably mounted between said translucent platform and said means for illuminating, said guide members including a first guide member slidable in a longitudinal direction and a second guide member slidable in a transverse direction, each of said guide members being elongated in a direction normal to its said direction of slidability and a ruling member, said ruling member being slidable on the side of said translucent plate opposite said guide members, and being elongated in a direction substantially normal to the direction of slidability.

2. The invention of claim 1 wherein said ruling member further includes a slidable mounting bracket adapted to be slid along the length of said rule, said mounting bracket securing rotatably a ruling leg which is adapted to be rotated to any angle with respect to said ruling member.

3. A printer's table including a translucent platform, said platform including guides for alignment of printed material on a flat carrier, means for illuminating the bottom of said platform so that said guides are visible through said carrier, guide members slidably mounted between said means for illuminating and said translucent platform for providing supplementary guidelines for a printer, said guide members comprising a pair of elongated strips having longitudinally extending openings therein, said openings providing an illuminated line which is visible through said translucent platform.

4. A printer's table including a translucent platform, said platform having guidelines printed therein, a plurality of elongated rods mounted to said table about the periphery of said platform, means for illuminating the bottom of said platform and elongated guide members, said guide members being slidably secured to said rods, said elongated guide members extending between said translucent platform and said means for illuminating being slidable along said rods to provide supplementary guides for a printer.

References Cited

UNITED STATES PATENTS

| | | | |
|---|---|---|---|
| 1,057,373 | 3/1913 | Bashelier | 33—184.5 |
| 2,034,529 | 3/1936 | Olsen | 33—184.5 |
| 2,492,528 | 12/1949 | Huebner | 33—184.5 |
| 2,562,695 | 7/1951 | Brown | 33—80 |
| 2,877,556 | 3/1959 | Hulen | 33—80 |
| 3,286,355 | 11/1966 | Charnock | 33—184.5 |
| 3,327,400 | 6/1967 | Barron | 33—184.5 |
| 3,357,107 | 12/1967 | Flower | 33—184.5 |
| 3,510,124 | 6/1950 | McKinney | 108—23 X |

WILLIAM D. MARTIN, Jr., Primary Examiner

U.S. Cl. X.R.

33—80